United States Patent
Kim et al.

(10) Patent No.: US 9,590,258 B2
(45) Date of Patent: Mar. 7, 2017

(54) APPARATUS AND METHOD FOR MANAGING FUEL CELL VEHICLE SYSTEM

(71) Applicant: Korea Institute of Energy Research, Daejeon (KR)

(72) Inventors: Min Jin Kim, Daejeon (KR); Young-Jun Sohn, Daejeon (KR); Gu-Gon Park, Daejeon (KR); Byung Chan Bae, Seoul (KR); Sung-Dae Yim, Daejeon (KR); Young-Woo Choi, Cheongju-si (KR); Seok-Hee Park, Daejeon (KR); Young-Gi Yoon, Daejeon (KR); Tae-Hyun Yang, Daejeon (KR); Won-Yong Lee, Daejeon (KR); Chang-Soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 14/883,226

(22) Filed: Oct. 14, 2015

(65) Prior Publication Data

US 2016/0036077 A1  Feb. 4, 2016

Related U.S. Application Data

(62) Division of application No. 14/028,084, filed on Sep. 16, 2013.

(30) Foreign Application Priority Data

Sep. 17, 2012 (KR) .................. 10-2012-0103025
Sep. 17, 2012 (KR) .................. 10-2012-0103036
Sep. 17, 2012 (KR) .................. 10-2012-0103042

(51) Int. Cl.
*H01M 8/04* (2016.01)

(52) U.S. Cl.
CPC ..... *H01M 8/04619* (2013.01); *H01M 8/0432* (2013.01); *H01M 8/0438* (2013.01);
(Continued)

(58) Field of Classification Search
CPC ....................................................... H01M 8/04
See application file for complete search history.

(56) References Cited

U.S. PATENT DOCUMENTS

| 7,767,328 B2 | 8/2010 | Kobayashi et al. |
| 2010/0203409 A1* | 8/2010 | Manabe ............ H01M 8/04268 429/431 |

FOREIGN PATENT DOCUMENTS

| JP | 2001102063 A | 4/2001 |
| JP | 2002190308 A | 7/2002 |

(Continued)

OTHER PUBLICATIONS

Lee et al., "Operating control of fuel cell hybrid vehicles" Aug. 18, 2006, pp. 143-154.

(Continued)

*Primary Examiner* — Jacob Marks
(74) *Attorney, Agent, or Firm* — The Webb Law Firm

(57) ABSTRACT

Provided are an apparatus and a method for managing a fuel cell vehicle system, and more particularly, an apparatus and a method for managing a fuel cell vehicle system capable of optimally maintaining a driving method based on environmental information and product information.

8 Claims, 8 Drawing Sheets

(52) U.S. Cl.
CPC ... *H01M 8/04365* (2013.01); *H01M 8/04388* (2013.01); *H01M 8/04395* (2013.01); *H01M 8/04492* (2013.01); *H01M 8/04544* (2013.01); *H01M 8/04559* (2013.01); *H01M 8/04574* (2013.01); *H01M 8/04589* (2013.01); *H01M 2250/20* (2013.01); *Y02E 60/50* (2013.01); *Y02T 90/32* (2013.01)

(56) References Cited

FOREIGN PATENT DOCUMENTS

| JP | 2005160238 A | 6/2005 |
|----|--------------|--------|
| KR | 1020020081296 A | 10/2002 |
| KR | 1020040111707 A | 12/2004 |
| KR | 1020110029501 A | 3/2011 |
| KR | 1020120008353 A | 1/2012 |

OTHER PUBLICATIONS

Ji et al., "Development of a performance model for PEMFC according to operating conditions" May 19, 2011, pp. 2334-2338.

\* cited by examiner

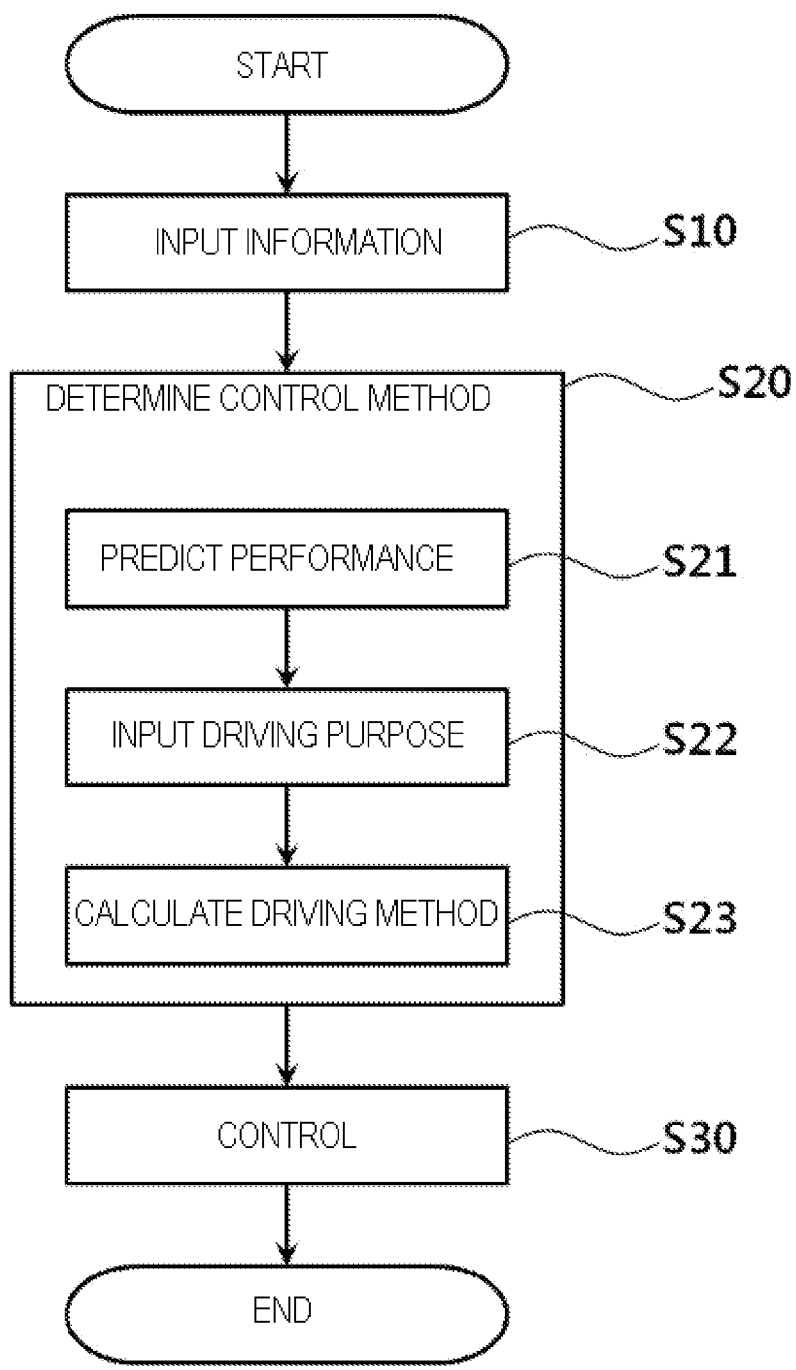

ably connected to a control unit of a vehicle fuel cell system 40; a collection unit 200 which is

APPARATUS AND METHOD FOR MANAGING FUEL CELL VEHICLE SYSTEM

CROSS-REFERENCE TO RELATED APPLICATIONS

This application is a divisional application of U.S. application Ser. No. 14/028,084, filed on Sep. 16, 2013, which claims priority under 35 U.S.C. §119 to Korean Patent Application No. 10-2012-0103025, filed on Sep. 17, 2012, No. 10-2012-0103036, filed on Sep. 17, 2012, and 10-2012-0103042, filed on Sep. 17, 2012, in the Korean Intellectual Property Office, the disclosures of which are incorporated herein by reference in their entirety.

TECHNICAL FIELD

The present invention relates to an apparatus and a method for managing a fuel cell vehicle system, and more particularly, to an apparatus and a method for managing a fuel cell vehicle system capable of optimally maintaining a driving method based on environmental information and product information.

BACKGROUND

Fossil fuel reserves are very restricted, and thus the depletion of the fossil fuel cannot is inevitable. In particular, since main emission sources of greenhouse gas causing global warming are fuel reserves, advanced countries have been focused on developing hydrogen energy, and the like, using alternative energy or atomic energy so as to decrease fossil fuels. An example of energy sources which have emerged as alternative energy may include solar energy, wind power, hydrogen energy, biomass, and the like. To use solar power or wind power, auxiliary facilities, such as a solar panel and a windmill, are required. However, since a wide space is required to install the solar panel or the windmill, other environmental problems, such as destruction of ecosystem and noise, may occur. Future energy needs requirements, such as environmental acceptability, economic productibility, and eternal capability.

A fuel cell is a cell which directly converts chemical energy generated by oxidation into electrical energy and is a new eco-friendly future energy technology of generating electrical energy from materials, which richly exist on earth, such as hydrogen and oxygen.

The fuel cell performs an electrochemical reaction in an electrolysis reverse reaction type of water by supplying oxygen to a cathode and hydrogen to an anode to produce electricity, heat, and water, thereby generating electrical energy at high efficiency without inducing pollutants.

A fuel cell vehicle is a future vehicle of a type of allowing a fuel cell using a chemical reaction of hydrogen and oxygen to drive an electric motor and therefore is likely to lead a future automobile industry. The technology may expect to reduce driving cost due to remarkable improvement of fuel efficiency and prevent air pollution due to reduction in exhaust gas.

For commercialization of the fuel cell vehicle, many problems, such as a method of manufacturing a fuel cell vehicle at a reasonable price, development of a fuel cell system with high efficiency, a technology of obtaining a large amount of hydrogen at a reasonable price, a safety hydrogen transportation system, a hydrogen repository, a pressure device for charging a vehicle at a reasonable price, construction of hydrogen infrastructure, and the like, are to be solved. Among them, many methods of increasing efficiency of a fuel cell system have been researched.

U.S. Pat. No. 7,767,328 discloses a system of tracking an optimal operation point of a fuel cell in a power supply device using a fuel cell and a power supply device including the system of tracking an optimal operation point of a fuel cell.

RELATED ART DOCUMENT

Patent Document

U.S. Pat. No. 7,767,328

SUMMARY

An exemplary embodiment of the present invention is directed to providing an apparatus for managing a vehicle fuel cell system capable of predicting performance, efficiency, and lifespan of components based on product information and optimally maintaining driving conditions based on environmental information.

In one general aspect, there is provided an apparatus for managing a vehicle fuel cell system, including: a connection unit 100 which is detachably connected to a control unit of a vehicle fuel cell system 40; a collection unit 200 which is connected to the connection unit 100 to receive data of the vehicle fuel cell system 40; a calculation unit 300 which is connected to the collection unit 200 to determine a method for controlling the vehicle fuel cell system 40 based on the received data; and a control unit 400 which is connected to the calculation unit 300 and the connection unit 100 to control the vehicle fuel cell system 40 on the basis of the control method determined by the calculation unit 300.

The connection unit 100 may be directly connected to the control unit of the vehicle fuel cell system 40, and the collection unit 200 and the control unit may be connected to each other by a cable.

The collection unit 200 may collect at least one information selected from a hydrogen use flow rate, voltage of a vehicle fuel cell stack 11, current of the vehicle fuel cell stack 11, temperature of the vehicle fuel cell stack 11, pressure of the vehicle fuel cell stack 11, a fuel and oxidizing agent use rate which is used in the vehicle fuel cell stack 11, humidity of the vehicle fuel cell stack 11, power of the vehicle fuel cell stack 11, balance of plant (BOP) 13 of the vehicle fuel cell system 40, efficiency of a DC/DC converter 12, total power consumption of a vehicle assist device 21 of a fuel cell vehicle, charging and discharging efficiency of a fuel cell vehicle battery 29, efficiency of a fuel cell vehicle DC/AC inverter 22, efficiency of a fuel cell vehicle motor 23, efficiency of a fuel cell vehicle transmission 24, and a driving distance of the fuel cell vehicle.

The calculation unit 300 may include: a prediction unit 310 which is connected to the collection unit 200 to predict the performance of the vehicle fuel cell system 40 based on the received data; and a determination unit 320 which is connected to the prediction unit 310 to determine a method for driving the vehicle fuel cell system 40 based on the performance of the vehicle fuel cell system 40, previously determined environmental information, and a previously determined driving purpose.

The determination unit 320 may include: a product performance collection unit 321 which is connected to the prediction unit 310 to receive performance information of the vehicle fuel cell system 40; an environmental information collection unit 322 which is connected to an external input device to receive at least one selected from hydrogen fuel cost, a hydrogen fuel heating value, hydrogen fuel composition information, a discount rate of the hydrogen fuel cost, a support fund for the hydrogen fuel cost, and a hydrogen fuel fare system; a control method collection unit 323 which is connected to the external input device to receive a driving purpose; and a driving method calculation unit 324 which is connected to the product performance collection unit 321, the environmental information collection unit 322, and the control method collection unit 323 to calculate the method for driving a vehicle fuel cell system 40 based on the performance, the environmental information, and the driving purpose of the vehicle fuel cell system 40.

The apparatus 1000 for managing a vehicle fuel cell system may further include: a display and control unit 500 which is connected to the calculation unit 300, inputs the environmental information and the driving purpose to the calculation unit 300, and outputs the input environmental information and driving purpose.

The display and control unit 500 may be operated by being provided in a driving seat of the fuel cell vehicle.

The driving purpose of the display and control unit 500 may be at least any one selected from the total efficiency of the fuel cell vehicle, the efficiency of the fuel cell system, the efficiency depending on the fuel efficiency, and the efficiency depending on the hydrogen fuel cost.

The apparatus 1000 for managing a vehicle fuel cell system may further include: a power supply unit 600 which includes a battery for supplying power to supply power to the apparatus 1000 for managing a vehicle fuel cell system.

The apparatus 1000 for managing a vehicle fuel cell system may further include: a data storage unit 700 which is connected to the calculation unit 300 to store and manage all the data; and a fuel cell analysis unit 800 which is connected to the data storage unit 700 to analyze the vehicle fuel cell system 40 so as to estimate characteristics of the vehicle fuel cell system 40.

The collection unit 200, the calculation unit 300, and the control unit 400 may be included in one housing.

In another general aspect, there is provided a method for managing a vehicle fuel cell system of an apparatus 1000 for a vehicle fuel cell system including a connection unit 100 which is detachably connected to a control unit of a vehicle fuel cell system 40, a collection unit 200, a calculation unit 300, and a control unit 400, the method including: inputting product information to the collection unit 200 through the connection unit and inputting environmental information to the calculation unit 300 connected to an external input device (S10); determining, by the calculation unit 300, a method for controlling the vehicle fuel cell system 40 to increase driving efficiency or decrease driving cost by calculating a driving method depending on at least any one driving purpose selected from high efficiency driving of a vehicle fuel cell module 10 and high efficiency driving of the vehicle fuel cell system 40 or at least any one driving purpose selected from low distance-fuel consumption driving and low cost driving, based on the product information and the environmental information input in the inputting of the information (S20); and controlling, by the control unit 400, the vehicle fuel cell system 40 on the basis of the control method determined by the determining of the control method (S30).

The product information of the inputting of the information (S10) is at least one information selected from a hydrogen use flow rate, the voltage of the vehicle fuel cell stack 11, the current of the vehicle fuel cell stack 11, the temperature of the vehicle fuel cell stack 11, the pressure of the vehicle fuel cell stack 11, the fuel and oxidizing agent use rate which is used in the vehicle fuel cell stack 11, the humidity of the vehicle fuel cell stack 11, the power of the vehicle fuel cell stack 11, the balance of plant (BOP) 13 of the vehicle fuel cell system 40, the efficiency of the DC/DC converter 12, the total power consumption of the vehicle assist device 21 of the fuel cell vehicle, the charging and discharging efficiency of the fuel cell vehicle battery 29, the efficiency of the fuel cell vehicle DC/AC inverter 22, the efficiency of the fuel cell vehicle motor 23, the efficiency of the fuel cell vehicle transmission 24, and the driving distance of the fuel cell vehicle; and the environmental information of the inputting of the information (S10) is at least any one selected from hydrogen fuel cost, a hydrogen fuel heating value, hydrogen fuel composition information, a discount rate of a hydrogen fuel cost, a support fund for the hydrogen fuel cost, and a hydrogen fuel fare system.

The high efficiency driving of the vehicle fuel cell module 10 is the highest efficiency driving of the vehicle fuel cell module 10 based on the following Formula.

$$\eta_{fcm-p} = \frac{3600 \times \left(W_{stack} - \frac{W_{BOP}}{E_{cov}}\right)}{F_{H2-in} \times K}$$

($\eta_{fcm-p}$ represents the efficiency of the vehicle fuel cell module 10, $W_{stack}$ represents electric output (voltage×current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $F_{H2-in}$ represents the flow rate of the hydrogen fuel supplied to the vehicle fuel cell module 10, and K represents the fuel heating value).

Further, the high efficiency driving of the vehicle fuel cell system 40 is the highest efficiency driving of the vehicle fuel cell system 40 based on the following Formula.

$$\eta_{fcbv-p} = \frac{3600 \times \left(W_{stack} - \frac{W_{BOP}}{E_{cov}} - \frac{W_{aux}}{E_{cov}E_{bat}}\right)E_{inv}E_{mot}E_{tra}}{F_{H2-in} \times K}$$

($\eta_{fcbv-p}$ represents the efficiency of the vehicle fuel cell system 40 having a battery, $W_{stack}$ stack represents electric output (voltage×current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $W_{aux}$ represents the total power consumption of the vehicle assist device 21 of the fuel cell vehicle, $E_{bat}$ represents the charging and discharging efficiency of the fuel cell vehicle battery 29, $E_{inv}$ represents the efficiency of the DC/AC inverter 22, $E_{mot}$ represents the efficiency of the fuel cell vehicle motor 23, $E_{tra}$ represents the efficiency of the fuel cell vehicle transmission 24, $F_{H2-in}$ represents the flow rate of the hydrogen fuel supplied to the vehicle fuel cell module 10, and K represents the fuel heating value).

The high efficiency driving of the vehicle fuel cell system 40 is the highest efficiency driving of the vehicle fuel cell system 40 based on the following Formula.

$$\eta_{fcv-p} = \frac{3600 \times \left(W_{stack} - \frac{W_{BOP}}{E_{cov}} - \frac{W_{aux}}{E_{cov}}\right)E_{inv}E_{mot}E_{tra}}{F_{H2-in} \times K}$$

($\eta$fcv-p represents the efficiency of the vehicle fuel cell system 40, $W_{stack}$ represents the electric output (voltage× current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $W_{aux}$ represents the total power consumption of the vehicle assist device 21 of the fuel cell vehicle, $E_{inv}$ represents the efficiency of the DC/AC inverter 22, $E_{mot}$ represents the efficiency of the fuel cell vehicle motor 23, $E_{tra}$ represents the efficiency of the fuel cell vehicle transmission 24, $F_{H2\text{-}in}$ represents the flow rate of the hydrogen fuel supplied to the vehicle fuel cell module 10, and K represents the fuel heating value).

The low distance-fuel consumption is the lowest distance-fuel consumption based on the following Formula.

$$\eta_{mileage} = \frac{F_{H2\text{-}in}}{D}$$

($\eta_{mileage}$ represents the distance-fuel consumption, $F_{H2\text{-}in}$ represents the flow rate of the hydrogen fuel supplied to the vehicle fuel cell module 10, and D represents the driving distance of the fuel cell vehicle).

The low cost driving is the lowest cost driving based on the following Formula.

$$C_{mileage} = UC_{H2}\frac{F_{H2\text{-}in}}{D}$$

($C_{mileage}$ represents the fuel use cost, $UC_{H2}$ represents the hydrogen fuel cost, $F_{H2\text{-}in}$ represents the flow rate of the hydrogen fuel supplied to the vehicle fuel cell module 10, and D represents the driving distance of the fuel cell vehicle).

The determining of the control method (S20) may include: predicting the performance of the vehicle fuel cell system 40 based on the product information input from the inputting of the information (S10) (S21); calculating the driving method depending on at least one driving condition based on the performance of the fuel cell system 40 predicted in the predicting of the performance (S21) and the environmental information input in the inputting of the information (S23); and determining at least one of the driving methods calculated in the calculating of the driving method (S23) (S24).

The determining of the control method (S20) may include: predicting the performance of the vehicle fuel cell system 40 based on the product information input in the inputting of the information (S10) (S21); selecting and inputting a driving purpose using an external input device (S22); and calculating the driving method based on the performance of the vehicle fuel cell system 40 predicted in the predicting of the performance (S21), the environmental information input in the inputting of the information (S10), and the driving purpose input in the inputting of the driving purpose (S22).

BRIEF DESCRIPTION OF THE DRAWINGS

FIG. 8 is a flow chart of a method for managing a vehicle fuel cell system according to a second exemplary embodiment of the present invention.

DETAILED DESCRIPTION OF MAIN ELEMENTS

10: VEHICLE FUEL CELL MODULE
11: VEHICLE FUEL CELL STACK
12: DC/DC CONVERTER
13: BALANCE OF PLANT (BOP)
20: ELECTRIC VEHICLE MODULE
21: VEHICLE ASSIST DEVICE
22: DC/AC INVERTER
23: MOTOR
24: TRANSMISSION
25: WHEEL
29: BATTERY
30: HYDROGEN FUEL
40: VEHICLE FUEL CELL SYSTEM
1000: APPARATUS FOR MANAGING VEHICLE FUEL CELL SYSTEM
100: CONNECTION UNIT
200: COLLECTION UNIT
300: CALCULATION UNIT
310: PREDICTION UNIT
320: DETERMINATION UNIT
321: PRODUCT PERFORMANCE COLLECTION UNIT
322: ENVIRONMENTAL INFORMATION COLLECTION UNIT
323: CONTROL METHOD COLLECTION UNIT
324: DRIVING METHOD CALCULATION UNIT
400: CONTROL UNIT
500: DISPLAY AND CONTROL UNIT
600: POWER SUPPLY UNIT
S10: INPUTTING INFORMATION
S20: DETERMINING CONTROL METHOD
S21: PREDICTING PERFORMANCE
S22: INPUTTING DRIVING PURPOSE
S23: CALCULATING DRIVING METHOD
S24: DETERMINING DRIVING METHOD
S30: CONTROLLING

Detailed Description of Embodiments

Hereinafter, an apparatus for managing a vehicle fuel cell system according to an exemplary embodiment of the present invention will be described in detail with reference to the accompanying drawings.

Figure 1:
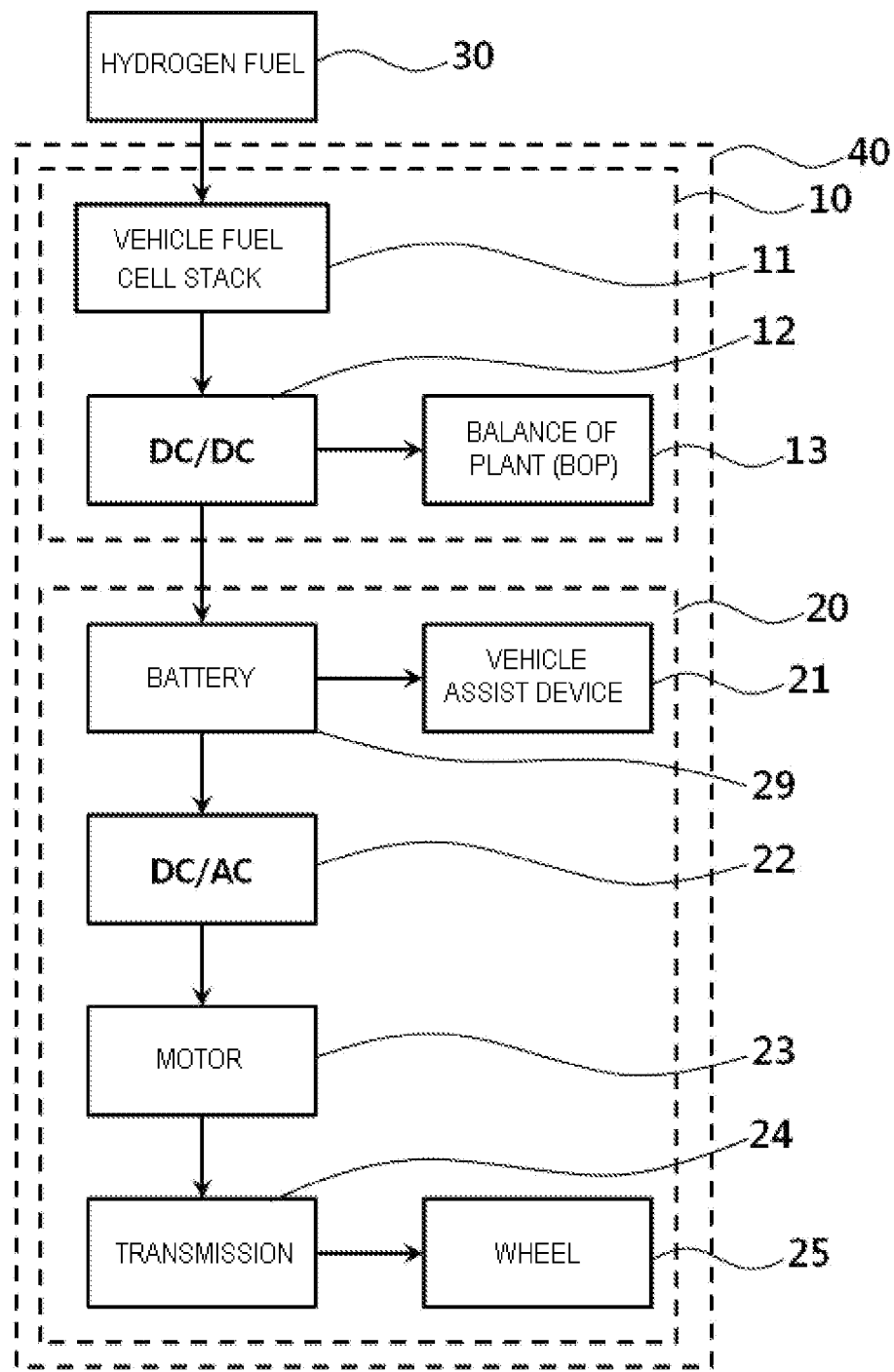
FIG. 1 is a conceptual diagram of a fuel cell vehicle according to the related art used by directly charging hydrogen fuel thereinto.
Figure 2:
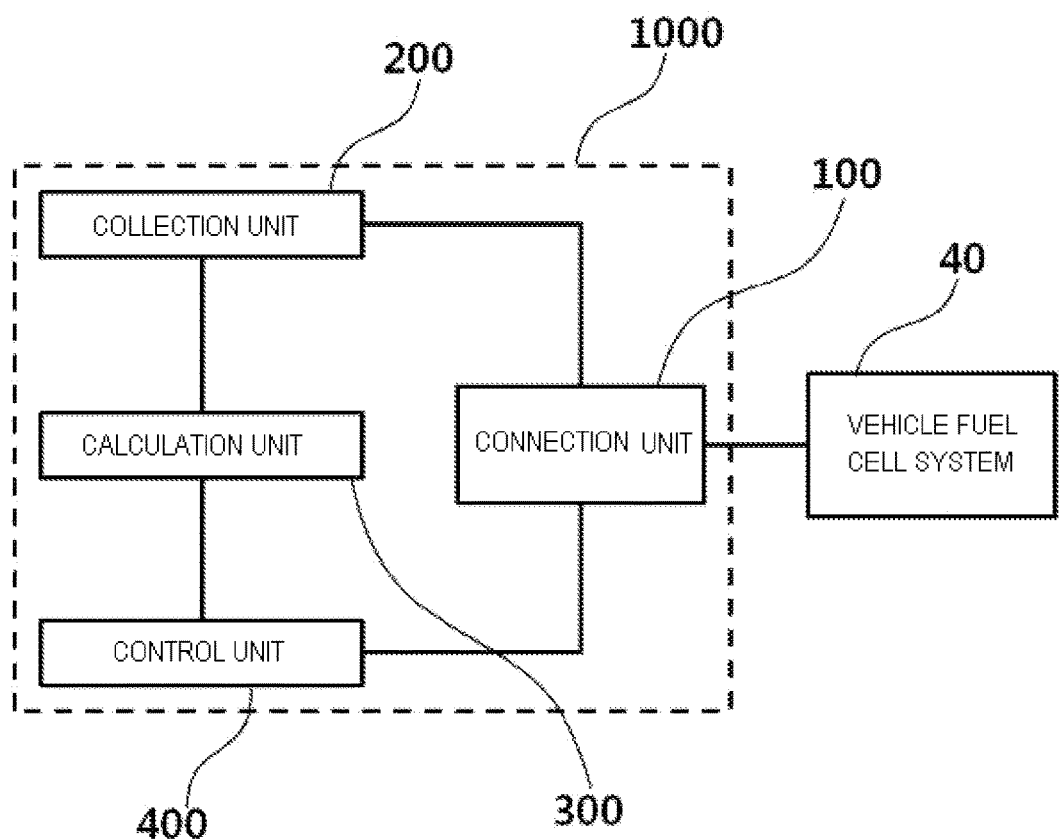
FIG. 2 is a conceptual diagram of an apparatus for managing a vehicle fuel cell system according to an exemplary embodiment of the present invention.
Figure 3:
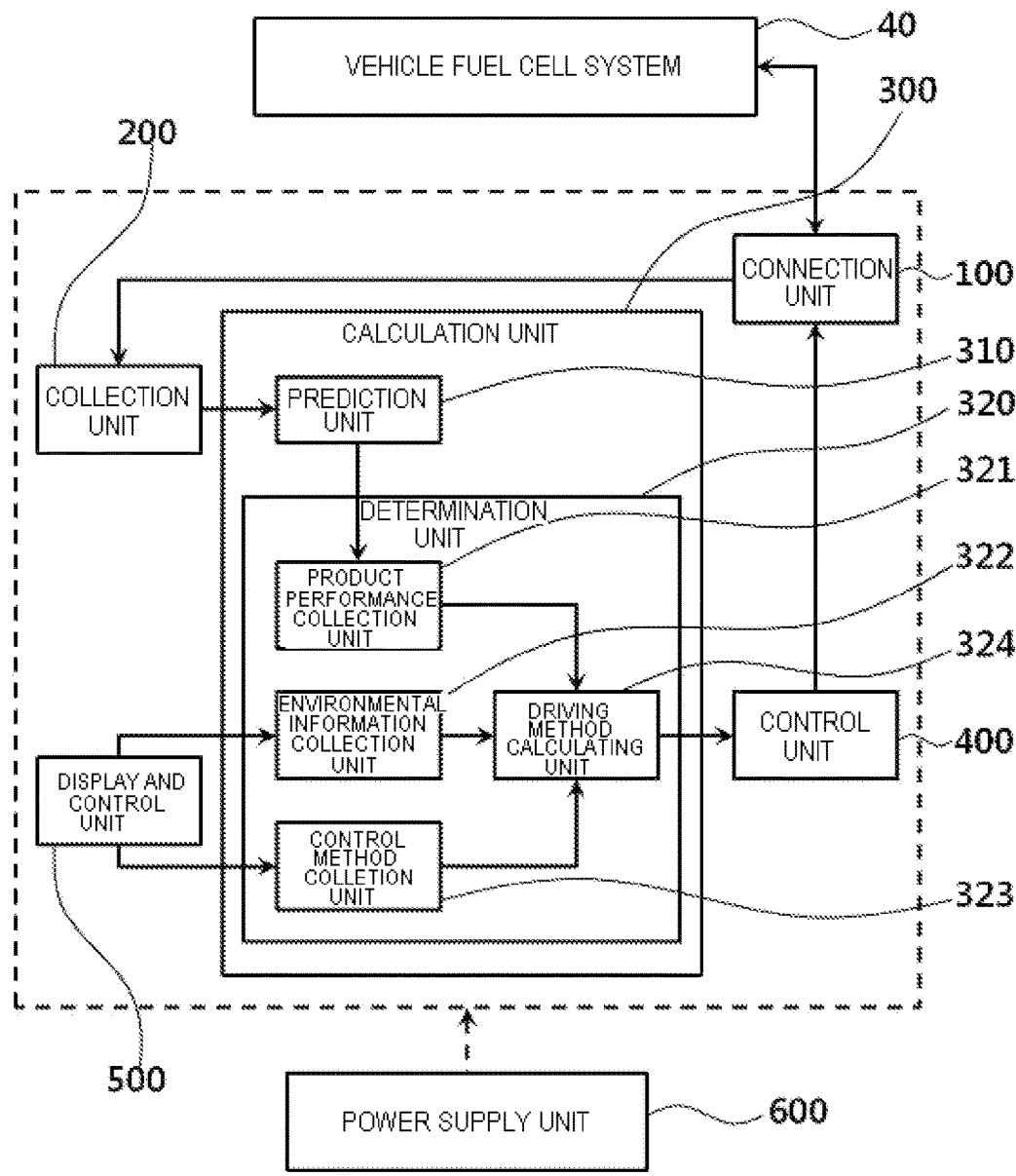
FIG. 3 is a detailed conceptual diagram of the apparatus for managing a vehicle fuel cell system according to the exemplary embodiment of the present invention.
Figure 4:
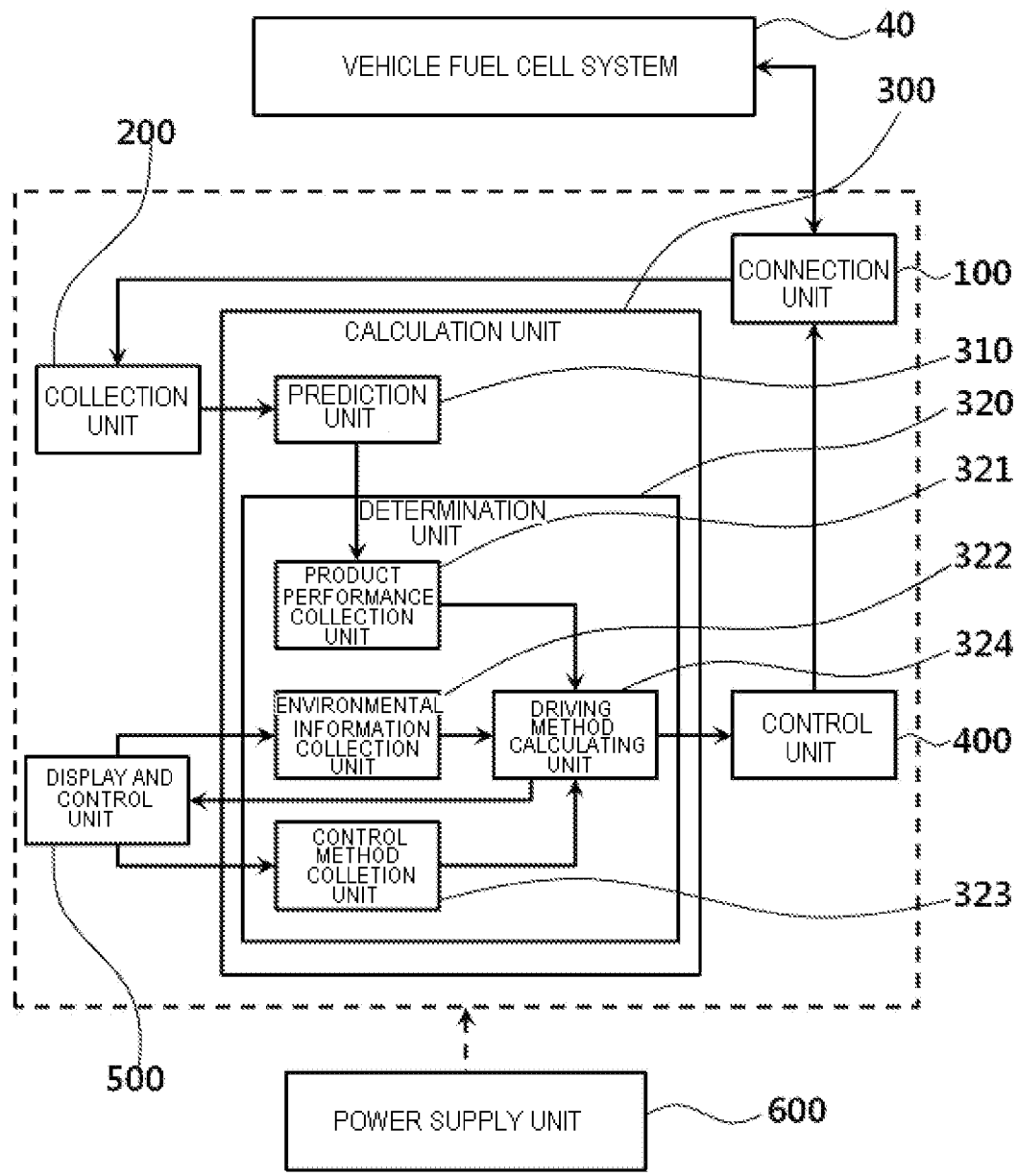
FIG. 4 is a detailed conceptual diagram of the apparatus for managing a vehicle fuel cell system according to the exemplary embodiment of the present invention.
Figure 5:
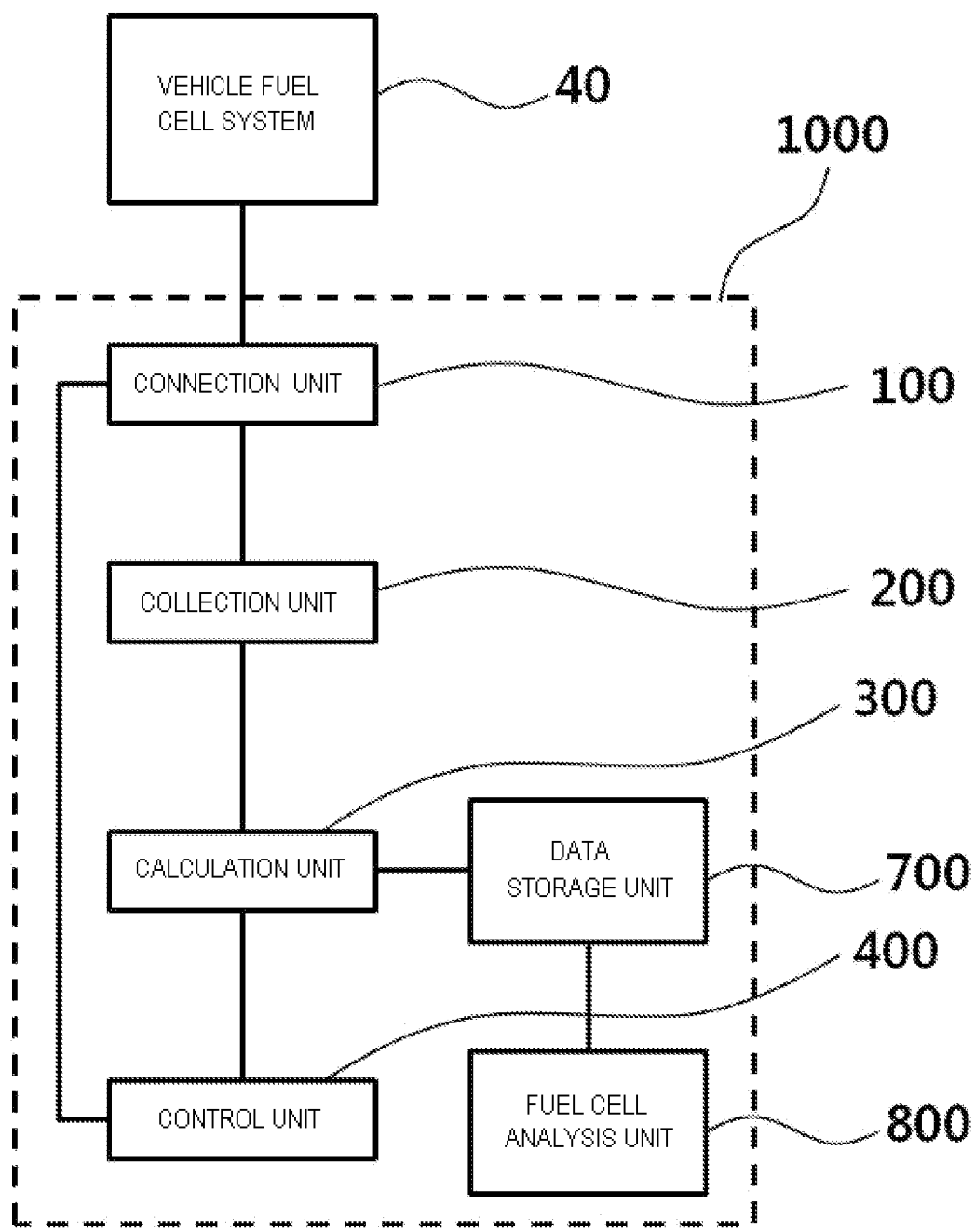
FIG. 5 is an exemplified diagram of the apparatus for managing a vehicle fuel cell system according to the exemplary embodiment of the present invention.
Figure 6:
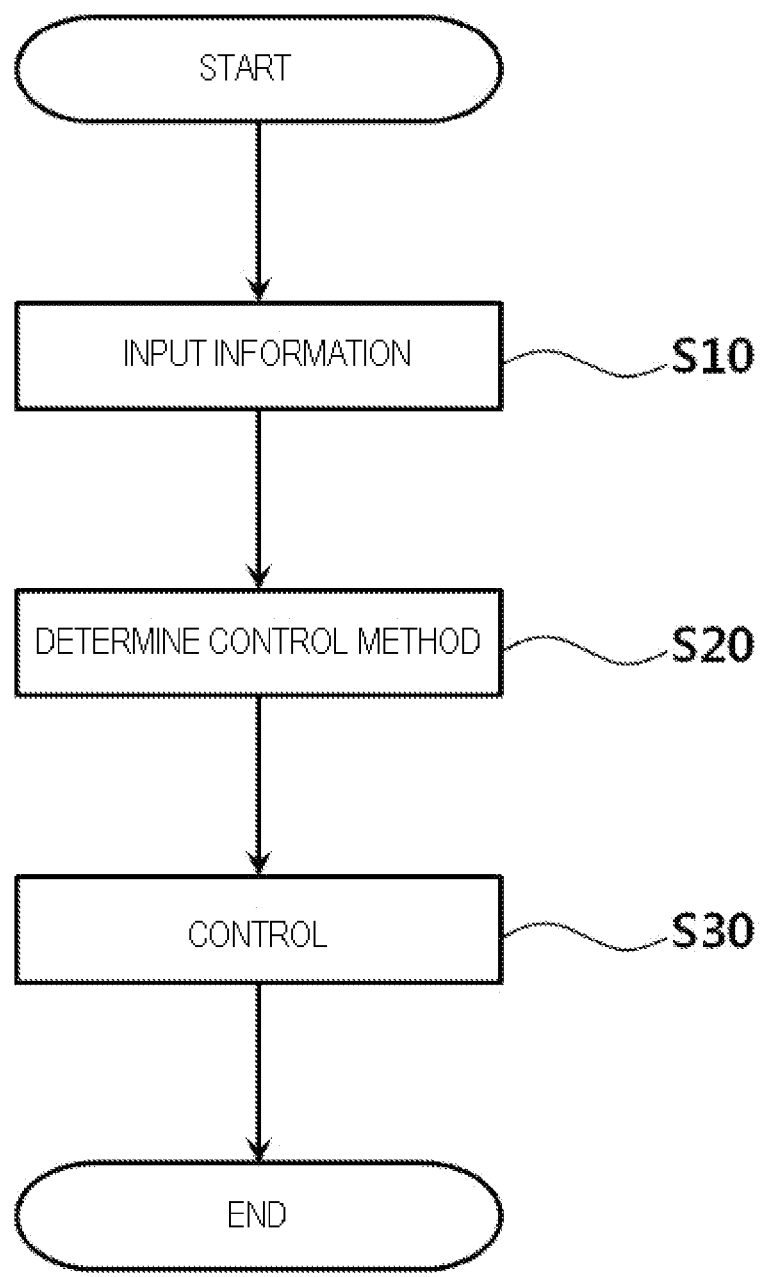
FIG. 6 is a flow chart of a method for managing a vehicle fuel cell system according to an exemplary embodiment of the present invention.
Figure 7:
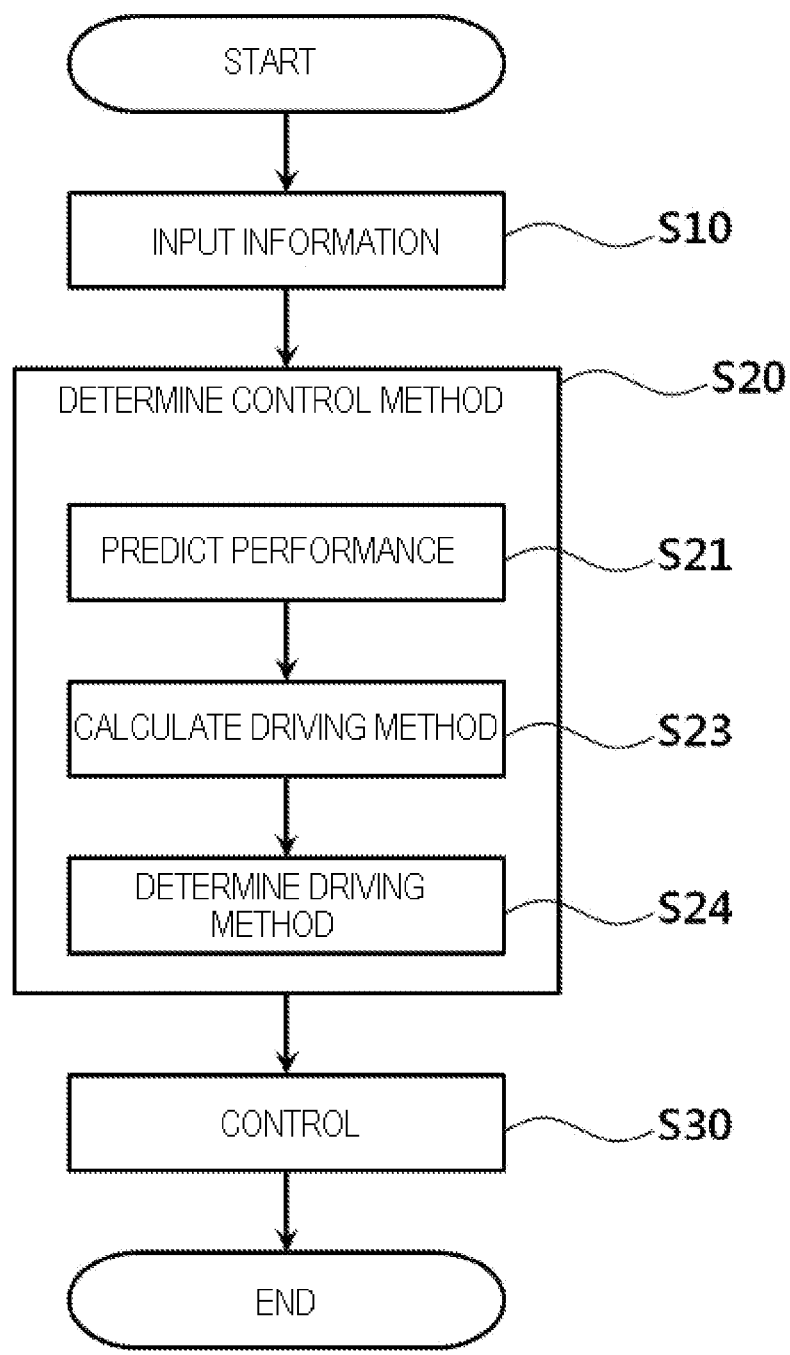
FIG. 7 is a flow chart of a method for managing a vehicle fuel cell system according to a first exemplary embodiment of the present invention.

FIG. 1 is a conceptual diagram of a fuel cell vehicle according to the related used by directly charging hydrogen fuel thereinto, FIG. 2 is a conceptual diagram of an apparatus for managing a vehicle fuel cell system according to an exemplary embodiment of the present invention. FIG. 3 is a detailed conceptual diagram of the apparatus for managing a vehicle fuel cell system according to the exemplary embodiment of the present invention, FIG. 4 is a detailed conceptual diagram of the apparatus for managing a vehicle fuel cell system according to the exemplary embodiment of the present invention, FIG. 5 is an exemplified diagram of the apparatus for managing a vehicle fuel cell system according to the exemplary embodiment of the present invention, FIG. 6 is a flow chart of a method for managing a vehicle fuel cell system according to an exemplary embodiment of the present invention, FIG. 7 is a flow chart of a method for managing a vehicle fuel cell system according to a first exemplary embodiment of the present invention, and FIG. 8 is a flow chart of a method for managing a vehicle fuel cell system according to a second exemplary embodiment of the present invention.

The apparatus for managing a vehicle fuel cell system according to the exemplary embodiment of the present invention relates to an apparatus controlling the vehicle fuel cell system by estimating performance of the vehicle fuel cell system by receiving data of the vehicle fuel cell system and calculating an efficient driving method according to environmental information and a driving purpose.

A general fuel cell vehicle is used by directly charging hydrogen fuel thereinto. As fuel which is an energy source, hydrogen, methanol, gasoline, and the like, may be used. However, in the case of using the methanol and the gasoline, there is a need to add a hydrogen generating apparatus (reformer), which has a technical difficulty and causes the increase in cost. Therefore, a vehicle having hydrogen as fuel merely injected thereinto is a general fuel cell vehicle.

As illustrated in FIG. 1, the vehicle fuel cell system 40 of the fuel cell vehicle used by directly charging hydrogen fuel thereinto may be configured to largely include a vehicle fuel cell module 10 and an electric car module 20. The vehicle fuel cell module 10 may be configured to include a vehicle fuel cell stack 11, a DC/DC converter 12, and a balance of plant (BOP) 13. In this configuration, the balance of plant (BOP) 13 may be a stack air blower, a stack cooling water pump, a stack humidifier, a hydrogen supply apparatus (hydrogen tank, regulator, controller), a recycle apparatus (blower, ejector), a heat exchanger, a radiator, a cooling fan, a control apparatus, various valves, a sensor, and the like. Further, the electric car module 20 may be configured to include a battery 29, a vehicle assist device 21, a DC/AC converter 22, a motor 23, a transmission 24, and a wheel 25. In this case, the battery 29 may be omitted.

Briefly describing an operation principle of the fuel cell vehicle used by directly charging hydrogen fuel thereinto, when hydrogen fuel 30 is supplied to the vehicle fuel cell stack 11, electricity is generated. The generated electricity is converted into required DC power by using the DC/DC converter 12 and the converted DC power is supplied to the balance of plant (BOP) 13 and the battery 29. The power supplied to the battery 29 is supplied to the vehicle assist device 21 and the DC/AC inverter 22. The power supplied to the DC/AC inverter is converted into AC power and the converted AC power operates the motor 23. The power converted into mechanical energy by the motor 23 is delivered to the wheel 25 through the transmission 24 to operate the fuel cell vehicle.

When the battery 29 is omitted, the converted DC power is supplied to the balance of plant (BOP) 13, the vehicle assist device 21, and the DC/AC inverter.

As illustrated in FIG. 2, the apparatus for managing a vehicle fuel cell system may be configured to include a connection unit 100, a collection unit 200, a calculation unit 300, and a control unit 400.

The general vehicle fuel cell module 10 receives a state of the vehicle fuel cell stack 11 to control a fuel cell and is configured to include a control unit (not illustrated) which may be connected to the outside. The control unit (not illustrated) for external connection may also be configured to be included in the vehicle fuel cell module 10 and the electric car module 20 and may be configured in the vehicle fuel cell system 40 which is configured to include the vehicle fuel cell module 10 and the electric car module 20.

The connection unit 100 is detachably connected to the vehicle fuel cell system 40 and is connected to the vehicle fuel cell system 40. In this configuration, the connection unit 100 may be connected to the control unit which may provide information required in the collection unit 200.

In this configuration, the connection unit 100 may be directly connected to the control unit of the vehicle fuel cell system 40, and the collection unit 200 and the control unit may be connected to each other by a cable. Further, the apparatus 1000 for managing a vehicle fuel cell system according to the exemplary embodiment of the present invention may be configured to include the collection unit 200, the calculation unit 300, and the control unit 400 in one housing. When the apparatus 1000 for managing a vehicle fuel cell system according to the exemplary embodiment of the present invention is connected to the fuel cell vehicle, in the case in which all the components of the apparatus 1000 for managing a vehicle fuel cell system are formed as a single assembly, the vehicle fuel cell system 40 is mounted at the rear, bottom, and front, and the like, of the general fuel cell vehicle, and when all the components of the apparatus 1000 for managing a vehicle fuel cell system according to the exemplary embodiment of the present invention are mounted in the vehicle fuel cell system 40, it may be difficult to directly monitor and operate these components at a driving seat. Therefore, the connection unit 100 and other components are connected to each other by the cable, and thus the connection unit 100 is connected to the control unit of the vehicle fuel cell system 40, such that other components may be freely disposed. Further, the apparatus for managing a vehicle fuel cell system is an electronic control apparatus and therefore is spaced apart from the vehicle fuel cell system 40 at a predetermined distance to reduce electromagnetic noises, such as electro-magnetic interference (EMI) and electro-magnetic susceptibility (EMS) which unnecessarily occur from electrical and electronic devices, thereby strengthening immunity of electromagnetic waves.

The collection unit 200 is connected to the connection unit 100 to receive the data of the vehicle fuel cell system 40. The data input from the vehicle fuel cell system 40 may be directly measured data, data received from the outside, and data calculated by using the directly measured data. In this case, the collection unit 200 collects at least one information selected from a hydrogen use flow rate, voltage of the vehicle fuel cell stack 11, current of the vehicle fuel cell stack 11, temperature of the vehicle fuel cell stack 11, pressure of the vehicle fuel cell stack 11, a fuel and oxidizing agent use rate which is used in the vehicle fuel cell stack 11, humidity of the vehicle fuel cell stack 11, power of the vehicle fuel cell stack 11, the balance of plant (BOP) 13 of the vehicle fuel cell system 40, efficiency of the DC/DC converter 12, total power consumption of the vehicle assist device 21 of the fuel cell vehicle, charging and discharging efficiency of the fuel cell vehicle battery 29, efficiency of the fuel cell vehicle DC/AC inverter 22, efficiency of the fuel cell vehicle motor 23, efficiency of the fuel cell vehicle transmission 24, and a driving distance of the fuel cell vehicle.

The calculation unit 300 is connected to the collection unit 200 to determine a control method of the vehicle fuel cell system 40 based on the received data.

Describing in more detail the calculation unit 300, as illustrated in FIGS. 3 to 5, the calculation unit 300 may be configured to include a prediction unit 310 and a determination unit 320.

The prediction unit 310 is connected to the collection unit 200 to determine the performance of the vehicle fuel cell system 40 based on the received data. In this case, the predictable performance of the vehicle fuel cell system 40 may be performance, efficiency, lifespan, and the like, of components of the vehicle fuel cell system 40.

The determination unit 320 is connected to the prediction unit 310 to determine the driving method of the vehicle fuel cell system 40 based on the performance, the predetermined environmental information, and the predetermined driving purpose of the vehicle fuel cell system 40.

Describing in more detail the determination unit 320, the determination unit 320 may be configured to include a product performance collection unit 321, an environmental information collection unit 322, a control method collection unit 323, and a driving method calculation unit 324.

The product performance collection unit 321 is connected to the prediction unit 310 to receive the performance information of the vehicle fuel cell system 40.

The environmental information collection unit 322 is connected to the external input device to receive environmental information of at least any one selected from hydrogen fuel cost, a hydrogen fuel heating value, hydrogen fuel composition information, a discount rate of a hydrogen fuel cost, a support fund for the hydrogen fuel cost, and a hydrogen fuel fare system. In this case, the environmental information may be wirelessly received in real time or received through the external input device and since it is difficult to include 100% of hydrogen in the hydrogen fuel, it is possible to more accurately calculate the optimal driving method at the time of inputting the hydrogen fuel heating value or composition information which may estimate the heating value.

The control method collection unit 323 is connected to the external input device to receive the driving purpose.

The driving method calculation unit 324 is connected to the product performance collection unit 321, the environmental information collection unit 322, and the control method collection unit 323 to calculate the driving method of the vehicle fuel cell system 40 based on the performance, the environmental information, and the driving purpose of the vehicle fuel cell system 40. In this case, various driving methods of the vehicle fuel cell system 40 may be calculated based on several driving purposes by using the performance and the environmental information of the vehicle fuel cell system 40. Further, one driving method may be calculated based on the performance, the environmental information, and the driving purpose of the vehicle fuel cell system 40. Describing by way of example, the performance and the environmental information of the vehicle fuel cell system 40 which may be acquired in real time are one, and various kinds of driving conditions may be generated depending on various directions. If it is assumed that the driving purpose is four conditions, four driving methods are calculated by calculating the driving method based on the four driving purposes using the performance and the environmental information of the vehicle fuel cell system 40. However, when the driving method is calculated by determining and using the performance, the environmental information, and the one driving purpose of the vehicle fuel cell system 40, only the one driving method may be calculated. Herein, if it is assumed that the four driving methods are calculated, one of them is determined and the control method of the vehicle fuel cell system 40 is determined based on the determined driving method to be able to control the vehicle fuel cell system 40. Further, if it is assumed that the one driving method is calculated, the driving method is determined by one of them and the control method of the vehicle fuel cell system 40 is determined based on the determined driving method to be able to control the vehicle fuel cell system 40. Various efficiencies depending on the driving purpose are presented in various aspects as described above and thus the efficiency of the vehicle fuel cell system 40 may be increased.

The control unit 400 is connected to the calculation unit 300 and the connection unit 100 to control the vehicle fuel cell system 40 on the basis of the control method determined by the calculation unit 300.

The apparatus 1000 for managing a vehicle fuel cell system according to the exemplary embodiment of the present invention further includes: a display and control unit 500 which is connected to the calculation unit 300, inputs the environmental information and the driving purpose to the calculation unit 300, and outputs the input environmental information and driving purpose. In this case, the display and control unit 500 may be operated by being provided in the driving seat of the fuel cell vehicle. Herein, the driving purpose of the display and control unit 500 is at least any one selected from the total efficiency of the fuel cell vehicle, the efficiency of the fuel cell system, the efficiency depending on the fuel efficiency, and the efficiency depending on the hydrogen fuel cost.

Describing in more detail the display and control unit 500, as illustrated in FIG. 3, the display and control unit 500 is connected to the environmental information collection unit 322 and the control method collection unit 323, respectively, to input the environmental information input through the display and control unit 500 to the environmental information collection unit 322 and input the driving method input through the display and control unit 500 to the control method collection unit 323. In this case, only one driving method may be calculated by inputting the environmental information and the driving method. Further, as illustrated in FIG. 4, the display and control unit 500 is connected to the environmental information collection unit 322, the control method collection unit 323, and the driving method calculation unit 324, respectively, to be able to output each of the driving methods through the display and control unit 500 and determine one driving method selected by the display and control unit 500 as the control method, depending on each of the driving purposes which may be selected based on the performance of the vehicle fuel cell system 40 input to the product performance collection unit 321 and the environmental information input to the environmental information collection unit 322. Further, the display and control unit 500 may output information for helping the selection of a driver.

As illustrated in FIGS. 3 and 4, the apparatus 1000 for managing a vehicle fuel cell system according to the exemplary embodiment of the present invention further includes a power supply unit 600. In this configuration, the power supply unit 600 includes a battery for supplying power and supplies power to the apparatus 1000 for managing a vehicle fuel cell system.

As illustrated in FIG. 5, the apparatus 1000 for managing a vehicle fuel cell system according to the exemplary embodiment of the present invention further includes a data storage unit 700 and a fuel cell analysis unit 800.

The data storage unit 700 is connected to the calculation unit 300 to store and manage all the data.

The fuel cell analysis unit 800 is connected to the data storage unit 700 to analyze the vehicle fuel cell system 40, thereby estimating the characteristics of the vehicle fuel cell system 40. In this case, the characteristics of the vehicle fuel cell system 40 which are figured out by using all the stored information may provide information suitable for improvement of a product.

As illustrated in FIG. 6, the method for managing a vehicle fuel cell system according to the exemplary embodiment of the present invention of the apparatus 1000 for managing a vehicle fuel cell system including the connection unit 100 which is detachably connected to the control unit of the vehicle fuel cell system 40, the collection unit 200, the calculation unit 300, and the control unit 400 includes the inputting of the information (S10), the determining of the control method (S20), and the controlling (S30).

In the inputting of the information (S10), the collection unit 200 receives the product information through the connection unit and the calculation unit 300 is connected to the external input device to receive the environmental information. In this case, the product information of the inputting of the information (S10) is at least one information selected from a hydrogen use flow rate, the voltage of the vehicle fuel cell stack 11, the current of the vehicle fuel cell stack 11, the temperature of the vehicle fuel cell stack 11, the pressure of the vehicle fuel cell stack 11, the fuel and oxidizing agent use rate which is used in the vehicle fuel cell stack 11, the humidity of the vehicle fuel cell stack 11, the power of the vehicle fuel cell stack 11, the balance of plant (BOP) 13 of the vehicle fuel cell system 40, the efficiency of the DC/DC converter 12, the total power consumption of the vehicle assist device 21 of the fuel cell vehicle, the charging and discharging efficiency of the fuel cell vehicle battery 29, the efficiency of the fuel cell vehicle DC/AC inverter 22, the efficiency of the fuel cell vehicle motor 23, the efficiency of the fuel cell vehicle transmission 24, and the driving distance of the fuel cell vehicle. Further, in the inputting of the information (S10), the environmental information is at least any one selected from the hydrogen fuel heating value and the hydrogen fuel composition information. In this case, the environmental information is connected to the external input device so as to be input from the external input device.

In the determining of the control method (S20), the calculation unit 300 calculates the driving method depending on at least one driving purpose selected from high efficiency driving of the vehicle fuel cell module 10 and high efficiency driving of the vehicle fuel cell system 40 or at least any one driving purpose selected from low distance-fuel consumption driving and low cost driving based on the product information and the environmental information input in the inputting of the information to determine the control method of the vehicle fuel cell system 40 for increasing the driving efficiency or decreasing the driving cost.

The high efficiency driving of the vehicle fuel cell module 10 is the highest efficiency driving of the vehicle fuel cell module 10 based on the following Formula.

$$\eta_{fcm-p} = \frac{3600 \times \left(W_{stack} - \frac{W_{BOP}}{E_{cov}}\right)}{F_{H2-in} \times K}$$

($\eta_{fcm-p}$ represents the efficiency of the vehicle fuel cell module 10, $W_{stack}$ represents electric output (voltage×current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $F_{H2-in}$ represents the flow rate of the hydrogen fuel supplied to the vehicle fuel cell module 10, and K represents the fuel heating value).

In this case, the electric output generated from the vehicle fuel cell stack 11 may be obtained by multiplying the current generated from the vehicle fuel cell stack 11 by the voltage generated from the vehicle fuel cell stack 11.

In the fuel cell vehicle configured to include the fuel cell vehicle battery 29, the high efficiency driving of the vehicle fuel cell system 40 is the highest efficiency driving of the vehicle fuel cell system 40 based on the following Formula.

$$\eta_{fcbv-p} = \frac{3600 \times \left(W_{stack} - \frac{W_{BOP}}{E_{cov}} - \frac{W_{aux}}{E_{cov}E_{bat}}\right) E_{inv} E_{mot} E_{tra}}{F_{H2-in} \times K}$$

$\eta_{fcbv-p}$ represents the efficiency of the vehicle fuel cell system 40 having a battery, $W_{stack}$ represents electric output (voltage×current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $W_{aux}$ represents the total power consumption of the vehicle assist device 21 of the fuel cell vehicle, $E_{bat}$ represents the charging and discharging efficiency of the fuel cell vehicle battery 29, $E_{inv}$ represents the efficiency of the DC/AC inverter 22, $E_{mot}$ represents the efficiency of the fuel cell vehicle motor 23, $E_{tra}$ represents the efficiency of the fuel cell vehicle transmission 24, $F_{H2-in}$ represents the flow rate of the hydrogen fuel supplied to the vehicle fuel cell module 10, and K represents the fuel heating value).

In the fuel cell vehicle which does not include the fuel cell vehicle battery 29, the high efficiency driving of the vehicle fuel cell system 40 is the highest efficiency driving of the vehicle fuel cell system 40 based on the following Formula.

$$\eta_{fcv-p} = \frac{3600 \times \left(W_{stack} - \frac{W_{BOP}}{E_{cov}} - \frac{W_{aux}}{E_{cov}}\right) E_{inv} E_{mot} E_{tra}}{F_{H2-in} \times K}$$

($\eta_{fcbv-p}$ represents the efficiency of the vehicle fuel cell system 40 having a battery, $W_{stack}$ represents electric output (voltage×current) generated from the vehicle fuel cell stack 11, $W_{BOP}$ represents the total power consumption of the balance of plant (BOP) 13 of the vehicle fuel cell system 40, $E_{cov}$ represents the efficiency of the DC/DC converter 12, $W_{aux}$ represents the total power consumption of the vehicle assist device 21 of the fuel cell vehicle, $E_{inv}$ represents the efficiency of the DC/AC inverter 22, $E_{mot}$ represents the efficiency of the fuel cell vehicle motor 23, $E_{tra}$ represents the efficiency of the fuel cell vehicle transmission 24, $F_{H2-in}$ represents the flow rate of the hydrogen fuel supplied to the vehicle fuel cell module 10, and K represents the fuel heating value).

Herein, when values for each variable in the Formula which may show the highest efficiency depending on at least any one driving purpose selected from the high efficiency driving of the vehicle fuel cell module 10 and the high efficiency driving of the vehicle fuel cell system based on the input information are determined, the corresponding device is controlled by values corresponding to the values for each variable. In this case, the Formula which may show the highest efficiency becomes the driving method and controlling the corresponding device by the values for each variable becomes the control method.

For example, in the case of the high efficiency driving of the vehicle fuel cell module 10, the driving method having the highest efficiency of the vehicle fuel cell module 10 may be calculated based on the electric output $W_{stack}$ which is generated from the vehicle fuel cell stack 11, the total power consumption $W_{BOP}$ of the balance of plant (BOP) 13 of the vehicle fuel cell system 40, the efficiency $E_{cov}$ of the DC/DC converter 12, the flow rate $F_{H2-in}$ of the hydrogen fuel supplied to the vehicle fuel cell module 10, and the fuel heating value K.

Herein, the electric output $W_{stack}$ which is generated from the vehicle fuel cell stack 11 has variable values when electrical efficiency related control variables (the fuel cell stack temperature, the fuel cell stack pressure, the fuel cell stack humidity, the fuel and oxidizing agent use rate of the fuel cell stack) are changed within a controllable range and the change in the values may be predicted based on a previously constructed model and the total power consumption $W_{BOP}$ of the balance of plant (BOP) 13 of the vehicle fuel cell system 40, the efficiency $E_{cov}$ of the DC/DC converter 12, the flow rate $F_{H2-in}$ of the hydrogen fuel supplied to the vehicle fuel cell module 10 are measured in real time and the fuel heating value K is received in real time to calculate the driving method (the values for the electric efficiency related control variables at which the electric output $W_{stack}$ generated from the vehicle fuel cell stack is highest) having the highest efficiency ($\eta_{fcm-p}$) of the vehicle fuel cell module 10 based on the above Formula.

Here, since it takes much time to measure the electric output $W_{stack}$ stack generated from the vehicle fuel cell stack by the experiment, a model (Formula) for the electric output $W_{stack}$ generated from the vehicle fuel cell stack may be constructed by numerous combinations of the driving variables based on a theoretical formula and an empirical formula which represent a correlation between already known various driving variables (the temperature of the fuel cell stack, the pressure of the fuel cell stack, the humidity of the fuel cell stack, the fuel and oxidizing agent use rate of the fuel cell stack) and the electric output generated from the vehicle fuel cell stack and the electric output generated from the vehicle fuel cell stack may be predicted in real time based on the previous construction model (Formula). In other words, by predicting the electric output $W_{stack}$ generated from the vehicle fuel cell stack by constructing the model, the real-time response may be performed without actually measuring the efficiency.

Further, the variables (the total power consumption $W_{BOP}$ of the balance of plant (BOP) 13 of the vehicle fuel cell system 40, the efficiency $E_{cov}$ of the DC/DC converter 12, the flow rate $F_{H2-in}$ of the hydrogen fuel supplied to the vehicle fuel cell module 12) which are frequently changed with the passage of time use values which are measured in real time.

The control method according to the driving method calculated as described above may control a flow rate of a heat recovery fluid and a setting temperature of an outlet of the vehicle fuel cell stack to control the fuel cell stack temperature, control a back pressure of the vehicle fuel cell stack to control the pressure of the fuel cell stack, control a humidification quantity of outlet gas of a humidifier attached to a fuel and oxidizing agent (air, and the like) supply unit of the vehicle fuel cell stack to control the humidity of the fuel cell stack, and control a supply quantity of the vehicle fuel cell stack air blower and the fuel supply apparatus to control the fuel and oxidizing use rate of the fuel cell stack.

In the high efficiency driving of the vehicle fuel cell system 40, the driving method having the highest efficiency of the vehicle fuel cell system 40 may be calculated based on the electric output $W_{stack}$ stack generated from the vehicle fuel cell stack 11, the total power consumption $W_{BOP}$ of the balance of plant (BOP) 13 of the vehicle fuel cell system 40, the efficiency $E_{cov}$ of the DC/DC converter 12, the total power consumption $W_{aux}$ of the vehicle assist device 21 of the fuel cell vehicle, the charging and discharging efficiency $E_{bat}$ of the fuel cell vehicle battery 29, the efficiency $E_{cov}$ of the DC/AC inverter 22, the efficiency $E_{mot}$ of the fuel cell vehicle motor 23, the efficiency $E_{tra}$ of the fuel cell vehicle transmission 24, the flow rate $F_{H2-in}$ of the hydrogen fuel supplied to the vehicle fuel cell module 10, and the fuel heating value K.

Even in this case, the electric output $W_{stack}$ generated from the vehicle fuel cell stack 11 may be predicted based on the previously constructed model, and the total power consumption $W_{BOP}$ of the balance of plant (BOP) 13 of the vehicle fuel cell system 40, the efficiency $E_{cov}$ of the DC/DC converter 12, the total power consumption $W_{aux}$ of the vehicle assist device 21 of the fuel cell vehicle, the charging and discharging efficiency $E_{bat}$ of the fuel cell vehicle battery 29, the efficiency $E_{cov}$ of the DC/AC inverter 22, the efficiency $E_{mot}$ of the fuel cell vehicle motor 23, the efficiency $E_{tra}$ of the fuel cell vehicle transmission 24, and the flow rate $F_{H2-in}$ of the hydrogen fuel supplied to the vehicle fuel cell module 10 are measured in real time and the fuel heating value K is received in real time to calculate the driving method (the value for the electric efficiency related control variables at which the electric output $W_{stack}$ stack generated from the vehicle fuel cell stack is highest) having the highest efficiency of the vehicle fuel cell system 40 having the battery based on the above Formula.

Further, the driving method (the value for the electric efficiency related control variables at which the electric output $W_{stack}$ stack generated from the vehicle fuel cell stack is highest) having the highest efficiency of the vehicle fuel cell system 40 may be calculated based on the above Formula.

The two Formulas may be selectively used depending on the case in which the charging and discharging efficiency of the fuel cell vehicle battery 29 is considered and the case in which the charging and discharging efficiency of the fuel cell vehicle battery 29 is not considered.

Further, the low distance-fuel consumption is the lowest distance-fuel consumption based on the following Formula.

$$\eta_{mileage} = \frac{F_{H2-in}}{D}$$

($\eta_{mileage}$ represents the distance-fuel consumption, $F_{H2-in}$ represents the flow rate of the hydrogen fuel supplied to the vehicle fuel cell module 10, and D represents the driving distance of the fuel cell vehicle).

The low cost driving is the lowest cost driving based on the following Formula.

$$C_{mileage} = UC_{H2} \frac{F_{H2-in}}{D}$$

($C_{mileage}$ represents the fuel use cost, $UC_{H2}$ represents the hydrogen fuel cost, $F_{H2-in}$ represents the flow rate of the hydrogen fuel supplied to the vehicle fuel cell module 10, and D represents the driving distance of the fuel cell vehicle).

Here, when the values for each variable for the Formula using the lowest cost depending on at least one driving purpose selected from the low distance-fuel consumption driving and the low cost driving based on the measured information are determined, the corresponding device is controlled by the values corresponding to the values of each variable. In this case, the Formula which may represent the lowest distance-fuel consumption or fuel use cost becomes the driving method and controlling the corresponding device by the values for each variable becomes the control method.

For example, in the case of the low distance-fuel consumption driving, the driving method having the lowest distance-fuel consumption may be calculated based on the flow rate $F_{H2-in}$ of the hydrogen fuel supplied to the vehicle fuel cell module 10 and the driving distance D of the fuel cell vehicle.

Here, when the driving distance related control variables (the temperature of the fuel cell stack, the pressure of the fuel cell stack, the humidity of the fuel cell stack, the fuel and oxidizing agent use rate of the fuel cell stack) are changed within the controllable range, the driving distance D of the vehicle fuel cell system 40 has the changed value depending on the change in the electric output $W_{stack}$ of the fuel cell stack which primarily varies due to the change and the variables (the total power consumption $W_{BOP}$ of the balance of plant (BOP) 13 of the vehicle fuel cell system 40, the efficiency $E_{cov}$ of the DC/DC converter 12, the total power consumption $W_{aux}$ of the vehicle assist device 21 of the fuel cell vehicle, the charging and discharging efficiency $E_{bat}$ of the fuel cell vehicle battery 29, the efficiency $E_{inv}$ of the DC/AC inverter 22, the efficiency $E_{mot}$ of the fuel cell vehicle motor 23, and the efficiency $E_{tra}$ of the fuel cell vehicle transmission 24) which are frequently changed with the passage of time, the change in the electric output $W_{stack}$ of the fuel cell stack may be predicted based on the previously constructed model and the variables which are frequently changed with the passage of time and the flow rate $F_{H2-in}$ of the hydrogen fuel supplied to the vehicle fuel cell module 10 are measured in real time to calculate the driving method (the values for the driving distance related control variables at which the electric output $W_{stack}$ generated from the vehicle fuel cell stack and the driving distance D of the fuel cell vehicle are highest) having the lowest distance-fuel consumption ($\eta_{mileage}$ based on the above Formula.

The control method according to the driving method calculated as described above may control a flow rate of a heat recovery fluid and a set temperature of an outlet of the vehicle fuel cell stack to control the fuel cell stack temperature, control a back pressure of the vehicle fuel cell stack to control the pressure of the fuel cell stack, control a humidification quantity of outlet gas of a humidifier attached to a fuel and oxidizing agent (air, and the like) supply unit of the vehicle fuel cell stack to control the humidity of the fuel cell stack, and control a supply quantity of the vehicle fuel cell stack air blower and the fuel supply apparatus to control the fuel and oxidizing use rate of the fuel cell stack.

In the case of the low cost driving, the driving method having the lowest cost driving may be calculated based on the hydrogen fuel cost $UC_{H2}$, the flow rate $F_{H2-in}$ of the hydrogen fuel supplied to the vehicle fuel cell module 10 and the driving distance D of the fuel cell vehicle.

Here, when the driving distance D of the vehicle fuel cell system 40 changes the driving distance related control variables (the temperature of the fuel cell stack, the pressure of the fuel cell stack, the humidity of the fuel cell stack, the fuel and oxidizing agent use rate of the fuel cell stack) within the controllable range, the change in the electric output $W_{stack}$ stack Of the fuel cell stack which primarily varies due to the change and the variables (the total power consumption $W_{BOP}$ of the balance of plant (BOP) 13 of the vehicle fuel cell system 40, the efficiency $E_{cov}$ of the DC/DC converter 12, the total power consumption $W_{aux}$ of the vehicle assist device 21 of the fuel cell vehicle, the charging and discharging efficiency $E_{bat}$ of the fuel cell vehicle battery 29, the efficiency $E_{inv}$ of the DC/AC inverter 22, the efficiency $E_{mot}$ of the fuel cell vehicle motor 23, and the efficiency $E_{tra}$ of the fuel cell vehicle transmission 24) which are frequently changed with the passage of time, the change in the electric output $W_{stack}$ of the fuel cell stack may be predicted based on the previously constructed model and the variables which are frequently changed with the passage of time, the flow rate $F_{H2-in}$ of the hydrogen fuel supplied to the vehicle fuel cell module 10 are measured in real time, and the hydrogen fuel cost $UC_{H2}$ is received in real time to calculate the driving method (the values for the driving distance related control variables at which the electric output $W_{stack}$ generated from the vehicle fuel cell stack and the driving distance D of the fuel cell vehicle are highest) having the lowest fuel use cost ($C_{mileage}$) based on the above Formula.

The control method according to the driving method calculated as described above may control a flow rate of a heat recovery fluid and a set temperature of an outlet of the vehicle fuel cell stack to control the fuel cell stack temperature, control a back pressure of the vehicle fuel cell stack to control the pressure of the fuel cell stack, control a humidification quantity of outlet gas of a humidifier attached to a fuel and oxidizing agent (air, and the like) supply unit of the vehicle fuel cell stack to control the humidity of the fuel cell stack, and control a supply quantity of the vehicle fuel cell stack air blower and the fuel supply apparatus to control the fuel and oxidizing use rate of the fuel cell stack.

As illustrated in FIG. 7, the determining of the control method (S20) of the method for managing a vehicle fuel cell system according to a first exemplary embodiment of the present invention includes predicting the performance (S21), calculating the driving method (S23), and determining the driving method (S24).

In the predicting of the performance (S21), the performance of the vehicle fuel cell system 40 is predicted based on the product information input in the inputting of the information (S10). In this case, the predictable performance of the vehicle fuel cell system 40 may be performance, efficiency, lifespan, and the like, of components of the vehicle fuel cell system 40.

In the calculating of the driving method (S23), the driving method depending on at least one driving condition is calculated based on the performance of the vehicle fuel cell system 40 predicted in the predicting of the performance (S21) and the environmental information input in the inputting of the information. In this case, various driving methods of the vehicle fuel cell system 40 may be calculated based on several driving purposes by using the performance and the environmental information of the vehicle fuel cell system 40. Describing by way of example, in calculating the driving method based on the performance and the environmental information of the vehicle fuel cell system 40 which may be acquired in real time, various kinds of driving conditions may be generated depending on various directions. If it is assumed that the driving purpose is four conditions, four driving methods are calculated by calculating the driving method based on the four driving purposes using the performance and the environmental information of the vehicle fuel cell system 40. Various efficiencies depending on the driving purpose are presented in various aspects as described above and thus the efficiency of the vehicle fuel cell system 40 may be increased.

In the determining of the driving method (S24), one of the at least one driving method calculated in the calculating of the driving method (S23) is selected. As described in the above example, if it is assumed that the four driving methods are calculated, one of them is determined and the control method of the vehicle fuel cell system 40 is determined based on the determined driving method to be able to control the vehicle fuel cell system 40.

As illustrated in FIG. 8, the determining of the control method (S20) of the method for managing a vehicle fuel cell system according to a second exemplary embodiment of the present invention includes the predicting of the performance (S21), the inputting of the driving purpose (S22), and the calculating of the driving method (S23).

In the predicting of the performance (S21), the performance of the vehicle fuel cell system 40 is predicted based on the product information input in the inputting of the information (S10). In this case, the predictable performance of the vehicle fuel cell system 40 may be performance, efficiency, lifespan, and the like, of components of the vehicle fuel cell system 40.

In the inputting of the driving purpose (S22), the driving purpose is selected and input by using the external input device.

In the calculating of the driving method (S23), the driving method is calculated based on the performance of the vehicle fuel cell system 40 predicted in the predicting of the performance (S21), the environmental information input in the inputting of the information (S10), and the driving purpose input in the inputting of the driving purpose (S22). When the driving method is calculated based on the performance of the vehicle fuel cell system 40, the environmental information, and the driving purpose input in the inputting of the driving purpose (S22), only the one driving method may be calculated. If it is assumed that only the one driving method is calculated, the control method of the vehicle fuel cell system 40 is determined based on the one driving method to be able to control the vehicle fuel cell system 40.

In the controlling (S30), the control unit 400 controls the vehicle fuel cell system 40 based on the control method determined in the determining of the control method. Herein, the flow rate of the heat recovery fluid and the setting temperature of the outlet of the vehicle fuel cell stack may be controlled by the method for controlling the temperature of the vehicle fuel cell stack. Further, the back pressure of the vehicle fuel cell stack may be controlled by the method for controlling the pressure of the vehicle fuel cell stack. Further, the supply quantity of the oxidizing agent (air, and the like) and fuel supply apparatus such as the vehicle fuel cell stack air blower and a hydrogen fuel supply valve may be controlled by the method for controlling the fuel and oxidizing agent use rate of the vehicle fuel cell stack. Further, the humidification quantity of the outlet gas of the humidifier attached to the fuel and oxidizing agent (air, and the like) of the vehicle fuel cell stack and may be controlled by the method for controlling the humidity of the vehicle fuel cell stack. Further, output power of the DC/AC inverter of an electric car module may be controlled by the method for controlling moving speed and acceleration of the fuel cell vehicle.

According to the exemplary embodiments of the present invention, the apparatus for managing a vehicle fuel cell system, which is an independent component additionally mounted in the completed vehicle fuel cell system, may have high compatibility, rapidly respond to the environmental information, such as the hydrogen fuel cost, the hydrogen fuel heating value, the hydrogen fuel composition information, the discount rate of the hydrogen fuel cost, the support fund for the hydrogen fuel cost, and the hydrogen fuel fare system which vary from hour to hour, to increase the efficiency, and rapidly respond to the product information, such as the performance, efficiency, and lifespan of the component to present and control the optimal driving conditions, thereby increasing the efficiency of the vehicle fuel cell system.

Further, according to the exemplary embodiments of the present invention, the method for managing a vehicle fuel cell system may rapidly respond to the environmental information, such as the hydrogen fuel heating value and the hydrogen fuel composition information which vary from hour to hour, to increase the efficiency and rapidly respond to the product information, such as the performance, efficiency, and lifespan of the component, to present and control the optimal driving conditions, thereby increasing the efficiency of the vehicle fuel cell system.

According to the exemplary embodiments of the present invention, the method for managing a vehicle fuel cell system may rapidly respond to the environmental information, such as the hydrogen fuel cost, the hydrogen fuel heating value, the hydrogen fuel composition information, the discount rate of the hydrogen fuel cost, the support fund for the hydrogen fuel cost, and the hydrogen fuel fare system which vary from hour to hour, to increase the efficiency, and rapidly respond to the product information, such as the performance, efficiency, and lifespan of the component to present and control the optimal driving conditions, thereby increasing the efficiency of the vehicle fuel cell system.

The present invention is not limited to the above-mentioned exemplary embodiments, and may be variously applied, and may be variously modified without departing from the gist of the present invention claimed in the claims.

What is claimed is:

1. A method for managing a vehicle fuel cell system of an apparatus for a vehicle fuel cell system including a connection unit which is detachably connected to a control unit of a vehicle fuel cell system, a collection unit, a calculation unit, and a control unit, the method comprising:
inputting product information to the collection unit through the connection unit and inputting environmental information to the calculation unit connected to an external input device;
determining, by the calculation unit, a control mode for the vehicle fuel cell system by calculating a driving mode depending on at least any one driving purpose to increase driving efficiency selected from high efficiency driving of a vehicle fuel cell module or high efficiency driving of the vehicle fuel cell system, or a driving mode depending on at least any one driving purpose to decrease driving cost selected from low distance-fuel consumption driving or low cost driving, based on the product information and the environmental information input in the inputting of the information; and controlling, by the control unit, the vehicle fuel cell system on the basis of the control mode determined by the determining of the control mode, wherein the product information of the inputting of the information is at least one information selected from a hydrogen use flow rate, the voltage of the vehicle fuel cell stack, the current of the vehicle fuel cell stack, the temperature of the vehicle fuel cell stack, the pressure of the vehicle fuel cell stack, the fuel and oxidizing agent use rate which is used in the vehicle fuel cell stack, the humidity of the vehicle fuel cell stack, the power of the vehicle fuel cell stack, the balance of plant (BOP) of the vehicle fuel cell system, the efficiency of the DC/DC converter, the total power consumption of the vehicle assist device of the fuel cell vehicle, the charging and discharging efficiency of the fuel cell vehicle battery, the efficiency of the fuel cell vehicle DC/AC inverter, the efficiency of the fuel cell vehicle motor, the efficiency of the fuel cell vehicle transmission, and the driving distance of the fuel cell vehicle; and the environmental information of the inputting of the information is at least any one selected from hydrogen fuel cost, a hydrogen fuel heating value, hydrogen fuel composition information, a discount rate of a hydrogen fuel cost, a support fund for the hydrogen fuel cost, and a hydrogen fuel fare system.

2. The method of claim 1, wherein the highest efficiency driving of the vehicle fuel cell module is the maximum efficiency driving of the vehicle fuel cell system calculated in the following Formula:

$$\eta_{fcm-p} = \frac{3600 \times \left(W_{stack} - \frac{W_{BOP}}{E_{cov}}\right)}{F_{H2-in} \times K}$$

wherein $\eta_{fcm-p}$ represents the efficiency of the vehicle fuel cell module, $W_{stack}$ represents electric output (voltage ×current) generated from the vehicle fuel cell stack, $W_{BOP}$ represents the total power consumption of the balance of plant (BOP) of the vehicle fuel cell system, $E_{cov}$ represents the efficiency of the DC/DC converter, $F_{H2-in}$ represents the flow rate of the hydrogen fuel supplied to the vehicle fuel cell module, and K represents the fuel heating value.

3. The method of claim 1, wherein the highest efficiency driving of the vehicle fuel cell system is the maximum efficiency driving of the vehicle fuel cell system calculated in the following Formula:

$$\eta_{fcbv-p} = \frac{3600 \times \left(W_{stack} - \frac{W_{BOP}}{E_{cov}} - \frac{W_{aux}}{E_{cov} E_{bat}}\right) E_{inv} E_{mot} E_{tra}}{F_{H2-in} \times K}$$

wherein $\eta_{fcbv-p}$ represents the efficiency of the vehicle fuel cell system having a battery, $W_{stack}$ represents electric output (voltage ×current) generated from the vehicle fuel cell stack, $W_{BOP}$ represents the total power consumption of the balance of plant (BOP) of the vehicle fuel cell system, $E_{cov}$ represents the efficiency of the DC/DC converter, $W_{aux}$ represents the total power consumption of the vehicle assist device of the fuel cell vehicle, $E_{bat}$ represents the charging and discharging efficiency of the fuel cell vehicle battery, $E_{inv}$ represents the efficiency of the DC/AC inverter, $E_{mot}$ represents the efficiency of the fuel cell vehicle motor, $E_{tra}$ represents the efficiency of the fuel cell vehicle transmission, $F_{H2-in}$ represents the flow rate of the hydrogen fuel supplied to the vehicle fuel cell module, and K represents the fuel heating value.

4. The method of claim 1, wherein the highest efficiency driving of the vehicle fuel cell system is the maximum efficiency driving of the vehicle fuel cell system calculated in the following Formula:

$$\eta_{fcv-p} = \frac{3600 \times \left(W_{stack} - \frac{W_{BOP}}{E_{cov}} - \frac{W_{aux}}{E_{cov}}\right) E_{inv} E_{mot} E_{tra}}{F_{H2-in} \times K}$$

wherein $\eta_{fcbv-p}$ represents the efficiency of the vehicle fuel cell system having a battery, $W_{stack}$ represents electric output (voltage ×current) generated from the vehicle fuel cell stack, $W_{BOP}$ represents the total power consumption of the balance of plant (BOP) of the vehicle fuel cell system, $E_{cov}$ represents the efficiency of the DC/DC converter, $W_{aux}$ represents the total power consumption of the vehicle assist device of the fuel cell vehicle, $E_{bat}$ represents the charging and discharging efficiency of the fuel cell vehicle battery, $E_{inv}$ represents the efficiency of the DC/AC inverter, $E_{mot}$ represents the efficiency of the fuel cell vehicle motor, $E_{tra}$ represents the efficiency of the fuel cell vehicle transmission, $F_{H2-in}$ represents the flow rate of the hydrogen fuel supplied to the vehicle fuel cell module, and K represents the fuel heating value.

5. The method of claim 1, wherein the low distance-fuel consumption is the minimum distance-fuel consumption calculated in the following Formula:

$$\eta_{mileage} = \frac{F_{H2-in}}{D}$$

wherein $\eta_{mileage}$ represents the distance-fuel consumption, $F_{H2-in}$ represents the flow rate of the hydrogen fuel supplied to the vehicle fuel cell module, and D represents the driving distance of the fuel cell vehicle.

6. The method of claim 1, wherein the low cost driving is the minimum cost driving calculated in the following Formula:

$$C_{mileage} = UC_{H2} \frac{F_{H2-in}}{D}$$

wherein $C_{mileage}$ represents the fuel use cost, $UC_{H2}$ represents the hydrogen fuel cost, $F_{H2-in}$ represents the flow rate of the hydrogen fuel supplied to the vehicle fuel cell module, and D represents the driving distance of the fuel cell vehicle.

7. The method of claim 1, wherein the determining of the control mode includes:
- predicting the performance of the vehicle fuel cell system based on the product information input from the inputting of the information;
- calculating the driving mode depending on at least one driving purpose based on the performance of the fuel cell system predicted in the predicting of the performance and the environmental information input in the inputting of the information; and
- determining at least one of the driving modes calculated in the calculating of the driving mode.

8. The method of claim 1, wherein the determining of the control mode includes:
- predicting the performance of the vehicle fuel cell system based on the product information input from the inputting of the information;
- selecting and inputting a driving purpose using an external input device; and
- calculating the driving mode based on the performance of the vehicle fuel cell system predicted in the predicting of the performance, the environmental information input in the inputting of the information, and the driving purpose input in the inputting of the driving purpose.

* * * * *

UNITED STATES PATENT AND TRADEMARK OFFICE
CERTIFICATE OF CORRECTION

PATENT NO. : 9,590,258 B2  
APPLICATION NO. : 14/883226  
DATED : March 7, 2017  
INVENTOR(S) : Min Jin Kim et al.

Page 1 of 1

It is certified that error appears in the above-identified patent and that said Letters Patent is hereby corrected as shown below:

In the Claims

Column 19, Lines 47-48, Claim 2, delete "(voltage ×current)" and insert -- (voltage × current) --

Column 20, Line 1, Claim 3, delete "(voltage ×current)" and insert -- (voltage × current) --

Column 20, Line 26, Claim 4, delete "$\eta_{fcbv\text{-}p}$" and insert -- $\eta_{fcv\text{-}p}$ --

Column 20, Line 28, Claim 4, delete "(voltage ×current)" and insert -- (voltage × current) --

Signed and Sealed this  
Second Day of May, 2017

Michelle K. Lee  
*Director of the United States Patent and Trademark Office*